United States Patent
Szczepanski et al.

(10) Patent No.: US 11,842,622 B2
(45) Date of Patent: Dec. 12, 2023

(54) SYSTEMS AND METHODS OF MONITORING ALARMS FROM THIRD PARTY DEVICES

(71) Applicant: Ademco Inc., Golden Valley, MN (US)

(72) Inventors: Dominik Szczepanski, Cedar Park, TX (US); Jeyaprakash Raveendran, Tamil Nadu (IN)

(73) Assignee: ADEMCO INC., Golden Valley, MN (US)

( * ) Notice: Subject to any disclaimer, the term of this patent is extended or adjusted under 35 U.S.C. 154(b) by 67 days.

(21) Appl. No.: 17/391,196

(22) Filed: Aug. 2, 2021

(65) Prior Publication Data

US 2023/0035710 A1     Feb. 2, 2023

(51) Int. Cl.

| | | |
|---|---|---|
| G08B 26/00 | (2006.01) | |
| G08B 25/10 | (2006.01) | |
| G08B 27/00 | (2006.01) | |
| H04L 67/12 | (2022.01) | |
| G08B 25/14 | (2006.01) | |
| H04L 41/06 | (2022.01) | |
| G08B 25/00 | (2006.01) | |

(Continued)

(52) U.S. Cl.
CPC .......... *G08B 26/008* (2013.01); *G08B 25/10* (2013.01); *G08B 25/14* (2013.01); *G08B 26/007* (2013.01); *G08B 27/005* (2013.01); *H04L 41/06* (2013.01); *H04L 67/12* (2013.01); *G08B 21/02* (2013.01); *G08B 25/00* (2013.01); *G08B 25/002* (2013.01); *G08B 29/02* (2013.01)

(58) Field of Classification Search
None
See application file for complete search history.

(56) References Cited

U.S. PATENT DOCUMENTS

| | | |
|---|---|---|
| 9,277,381 B2 | 3/2016 | Hicks, III |
| 9,652,971 B1 * | 5/2017 | Trundle ............. G08B 21/0255 |
| 10,530,839 B2 | 1/2020 | Kitchen et al. |

(Continued)

FOREIGN PATENT DOCUMENTS

WO     2020206453 A1     10/2020

OTHER PUBLICATIONS

International Patent Application No. PCT/US2022/038020, International Search Report and Written Opinion with Partial English Machine Translation dated Oct. 28, 2022, 13 pages.

*Primary Examiner* — Lashonda Jacobs-Burton
(74) *Attorney, Agent, or Firm* — Fredrikson & Byron, P.A.

(57) ABSTRACT

A server acts as an event analyzer for a home security or monitoring system. The server receives a signal from a remote third-party server, the signal including data relating to a condition detected by a device at a premises. The server determines whether the remote third-party server corresponds to a preexisting third-party server registration. The server determines whether the device corresponds to a preexisting device registration. When the remote third-party server is determined to correspond to the preexisting third-party server registration and the device is determined to correspond to the preexisting device registration, the server determines whether the condition detected by the device at the premises is an alarm condition. When the condition detected by the device at the premises is determined to be the alarm condition, the server transmits an alarm signal to a central monitoring station.

20 Claims, 5 Drawing Sheets

(51) Int. Cl.
*G08B 29/02* (2006.01)
*G08B 21/02* (2006.01)

(56) References Cited

U.S. PATENT DOCUMENTS

| | | | | |
|---|---|---|---|---|
| 10,726,704 B1* | 7/2020 | Kern | ............ | G08B 25/014 |
| 10,741,057 B2* | 8/2020 | Cohn | ............ | G08B 25/004 |
| 10,798,804 B2 | 10/2020 | Fadell et al. | | |
| 2005/0216580 A1* | 9/2005 | Raji | ............ | H04L 41/0853 |
| | | | | 709/223 |
| 2005/0248444 A1* | 11/2005 | Joao | ............ | B60R 25/104 |
| | | | | 340/539.11 |
| 2012/0084857 A1* | 4/2012 | Hubner | ............ | G08B 25/001 |
| | | | | 726/22 |
| 2014/0266699 A1* | 9/2014 | Poder | ............ | G08B 25/006 |
| | | | | 340/539.13 |
| 2014/0327777 A1* | 11/2014 | Jackson | ............ | G08B 13/19669 |
| | | | | 348/155 |
| 2015/0029020 A1* | 1/2015 | Bailey | ............ | G08B 25/005 |
| | | | | 340/502 |
| 2015/0063643 A1* | 3/2015 | Jackson | ............ | G08B 13/19663 |
| | | | | 382/103 |
| 2016/0240074 A1 | 8/2016 | Probin et al. | | |
| 2017/0054571 A1* | 2/2017 | Kitchen | ............ | G06F 9/547 |
| 2017/0068419 A1 | 3/2017 | Sundermeyer et al. | | |
| 2017/0116847 A1* | 4/2017 | Ferro | ............ | G08B 29/185 |
| 2017/0185277 A1* | 6/2017 | Sundermeyer | ...... | H04L 12/2803 |
| 2018/0025617 A1* | 1/2018 | Hesford | ............ | G08B 25/005 |
| | | | | 340/506 |
| 2018/0198247 A1* | 7/2018 | Klein | ............ | H02B 1/26 |
| 2018/0367731 A1* | 12/2018 | Gatti | ............ | H04N 21/4223 |
| 2018/0374333 A1* | 12/2018 | Coles | ............ | G08B 25/14 |
| 2018/0375680 A1* | 12/2018 | Wright | ............ | G01F 23/00 |
| 2020/0027338 A1* | 1/2020 | Poder | ............ | G08B 25/008 |
| 2020/0049563 A1* | 2/2020 | Fadell | ............ | H05B 47/19 |
| 2021/0022230 A1* | 1/2021 | Fadell | ............ | G08B 17/00 |
| 2021/0343139 A1* | 11/2021 | Poder | ............ | G08B 29/185 |
| 2022/0068097 A1* | 3/2022 | Picardi | ............ | G06N 3/045 |
| 2022/0116356 A1* | 4/2022 | Baum | ............ | H04W 12/50 |
| 2022/0337611 A1* | 10/2022 | Brazao | ............ | H04L 9/0891 |
| 2022/0376943 A1* | 11/2022 | Kitchen | ............ | G06F 9/547 |

\* cited by examiner

SYSTEMS AND METHODS OF MONITORING ALARMS FROM THIRD PARTY DEVICES

TECHNICAL FIELD

The disclosure relates to electronic monitoring systems.

BACKGROUND

A home network may use a wireless network protocol to connect devices within the home. For example, a hub device may use IEEE 802.15.4 to connect over one hundred sensor devices in a home to the hub device. The hub device may then collect sensor data collected by the sensor devices in the home. For instance, the hub device may collect door/window, or other security or home automation, sensor readings and output the door/window, or other security or home automation, sensor readings to a home security sensor or other device in the home network or, in some cases, to a remote server. In another instance, the hub device may collect temperature readings from multiple temperature sensors arranged within the home and output the temperature readings to a thermostat that controls an HVAC system using the temperature readings.

SUMMARY

In general, the disclosure is directed to a server that facilitates communication between central monitoring services and electronic monitoring devices issued through one or more third-party cloud services. For instance, rather than each distinct third-party providing monitoring services to individual homes and businesses, the server configured according to this disclosure provides a registration system for one or more third-party servers or cloud services such that the server receives registration information for the remote third-party server, and further receives registration information from devices issued by an entity associated with the remote third-party server. With these properties registered with the server, if the device registers a condition that may be cause to issue an alarm, the third-party server will forward the condition information to the server rather than spending its own processing power on analyzing the condition. The server will evaluate the condition to detect a possible alarm condition that requires reporting to a central monitoring service.

Rather than forcing individual entities to create, maintain, and process commands for monitoring services, the server can provide a centralized service to provide the life-saving services for the third-party entities that focus on providing sensor devices and data regulation to the user. Given the establishment of the monitoring service at the server, additional third-party entities may utilize the already established monitoring capabilities for minimal costs to the entity that owns the server, and for reduced costs for the third-party entity due to the lack of need to generate their own monitoring. By having access to each entity's particular encoding and decoding system, conditions and signals can be transmitted between the server and the remote third-party server in a secure manner while still providing the server with the capability to provide the life-saving monitoring services to the end user. Further, by providing only the monitoring and alarm generating functions, the entity that operates the server may optimize those particular processes, thereby improving the overall computing environment in which this monitoring occurs.

In one example, the disclosure is directed to a method comprising receiving, by a server, a signal from a remote third-party server, the signal including data relating to a condition detected by a device at a premises. The method further includes determining, by the server, whether the remote third-party server corresponds to a preexisting third-party server registration. The method also includes determining, by the server, whether the device corresponds to a preexisting device registration. The method further includes, when the remote third-party server is determined to correspond to the preexisting third-party server registration and the device is determined to correspond to the preexisting device registration, determining, by the server, whether the condition detected by the device at the premises is an alarm condition. The method also includes, when the condition detected by the device at the premises is determined to be the alarm condition, transmitting, by the server, an alarm signal to a central monitoring station.

In another example, the disclosure is directed to a server comprising one or more communication units and one or more processors. The one or more processors are configured to receive, via the one or more communication units, a signal from a remote third-party server, the signal including data relating to a condition detected by a device at a premises. The one or more processors are further configured to determine whether the remote third-party server corresponds to a preexisting third-party server registration. The one or more processors are also configured to determine whether the device corresponds to a preexisting device registration. The one or more processors are further configured to, when the remote third-party server is determined to correspond to the preexisting third-party server registration and the device is determined to correspond to the preexisting device registration, determine whether the condition detected by the device at the premises is an alarm condition. The one or more processors are also configured to when the condition detected by the device at the premises is determined to be the alarm condition, transmit, via the one or more communication units, an alarm signal to a central monitoring station.

In another example, the disclosure is directed to a non-transitory computer-readable storage medium containing instructions. The instructions, when executed, cause one or more processors to receive a signal from a remote third-party server, the signal including data relating to a condition detected by a device at a premises. The instructions, when executed, further cause the one or more processors to determine whether the remote third-party server corresponds to a preexisting third-party server registration. The instructions, when executed, also cause the one or more processors to determine whether the device corresponds to a preexisting device registration. The instructions, when executed, further cause the one or more processors to, when the remote third-party server is determined to correspond to the preexisting third-party server registration and the device is determined to correspond to the preexisting device registration, determine whether the condition detected by the device at the premises is an alarm condition. The instructions, when executed, also cause the one or more processors to, when the condition detected by the device at the premises is determined to be the alarm condition, transmit an alarm signal to a central monitoring station.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
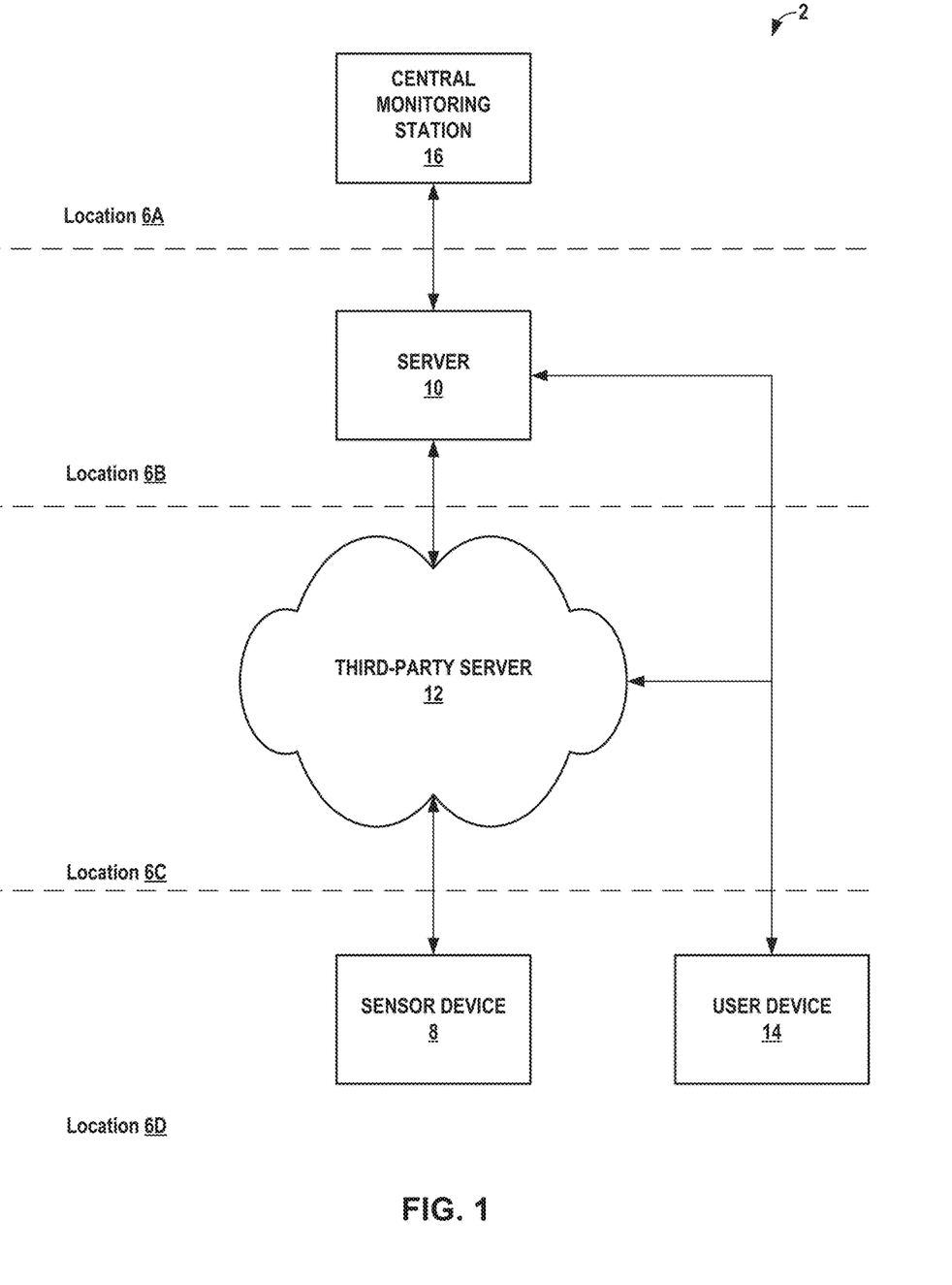
FIG. 1 is a conceptual diagram illustrating devices in communication in an overall monitoring system, in accordance with some examples of this disclosure.

FIG. 1 is a conceptual diagram illustrating devices in communication in an overall monitoring system 2, in accordance with some examples of this disclosure. Monitoring system 2 includes server 10, third-party server 12, sensor device 8, user device 14, and central monitoring station 16. As shown in FIG. 1, each of central monitoring station 16, server 10, and third-party server 12 may be at different locations (6A, 6B, and 6C, respectively), and sensor device 8 and user device 14 may be at a same location 6D different from locations 6A, 6B, and 6C. However, in other instances, sensor device 8 and user device 14 may be at different locations.

Sensor device 8 at location 6D may be any sensor that can be installed at a home, business, or other premises for the purpose of providing some sort of automatic monitoring or environment manipulation, with location 6D being the home, business, or other premises. For instance, sensor device 8 may be any of a security device, a water heater, a water flow controller, a garage door controller, a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices that may perform the monitoring or automation functions described herein.

User device 14 may be any computing device, mobile or stationary, that a user may access for various day-to-day functions that the user may perform and that is capable of displaying or otherwise providing notifications to a user. For instance, user device 14 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein. While user device 14 may be at location 6D, user device 14 may also be at any other location where a user is also located.

Third-party server 12 may be any computer with the processing power required to adequately execute the techniques described herein. For instance, third-party server 12 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein. Third-party server 12 may be located at location 6C, which may be a headquarters, operating center, or data center of an entity associated both with third-party server 12 and sensor device 8.

Server 10 may be any computer with the processing power required to adequately execute the techniques described herein. For instance, server 10 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein. For instance, server 10 may be a server system located at location 6B, which may be a headquarters, operating center, or data center different than third-party server 12's location 6C.

Central monitoring station 16, located at location 6A, may be any physical device or location actively monitoring for alarm conditions reported to central monitoring station 16 while also being capable of contacting or dispatching emergency services to location 6D. For instance, central monitoring station 16 may be a security center for monitoring location 6D and/or other locations, or central monitoring station 16 may be a police station, a fire department, an emergency medical service, or a dispatch for any of a police station, a fire department, and an emergency medical service.

In accordance with the techniques described herein, server 10 may receive a signal from third-party server 12. The signal may include data relating to a condition detected by sensor device 8 at location 6D. Server 10 may determine whether third-party server 12 corresponds to a preexisting third-party server registration stored in a database accessible by server 10. Server 10 may also determine whether sensor device 8 corresponds to a preexisting device registration stored in a database accessible by server 10. When third-party server 12 is determined to correspond to the preexisting third-party server registration and sensor device 8 is determined to correspond to the preexisting device registration, server 10 may determine whether the condition detected by sensor device 8 at the location 6D is an alarm condition. When the condition detected by sensor device 8 at location 6D is determined to be the alarm condition, server 10 may transmit an alarm signal to central monitoring station 16. In addition to transmitting the alarm signal, or in lieu of transmitting the alarm signal when the condition is not the alarm condition, server 10 may also send a notification and/or a confirm/deny request to user device 14 to help limit the potential of false alarms and to make the user aware of the condition if the user is not present at location 6D.

Server 10 may control the preexisting registrations stored in the database to enable the communication between third-party server 12 and server 10 such that server 10 may analyze the data generated by sensor device 8. For instance, server 10 may initially receive server enrollment information from third-party server 12. The server enrollment information can include any one or more of a plurality of device types served by third-party server 12 (e.g., the different devices that sensor device 8 may be), encoding keys used by third-party server 12 and sensor device 8, decoding keys used by third-party server 12 and sensor device 8, an identifier for third-party server 12, and operational information for each of the plurality of device types. Server 10 may then store the server enrollment information as the preexisting third-party server registration in the database accessible by server 10 such that server 10 may identify signals received from third-party server 12.

Server 10 may also receive device enrollment information for sensor device 8 located at location 6D. In some instances, server 10 may receive this information directly from user device 14 through an application installed on user device 14 or from a registration performed at third-party server 12. The device enrollment information may include any one or more of a device type of sensor device 8 chosen from the plurality of device types, an indication of third-party server 12, an identifier for sensor device 8 (e.g., a serial number or a media access control (MAC) address), a contact ID for sensor device 8 (e.g., a user's mobile phone number, mobile device information, a user's address, etc.), and operational information of sensor device 8 at the premises. Server 10 may store the device enrollment information as the preexisting device registration in the database accessible by server 10 such that server 10 may identify signals received from third-party server 12 as originating from sensor device 8.

While FIG. 1 only shows a single third-party server and a single sensor device, server 10 may also have a same relationship with multiple sensor devices at a single location, multiple locations served by the same third-party server, and even multiple different third-party servers. In other words, server 10 may receive multiple third-party server registrations, some of which are from different entities, and may receive multiple device registrations for each location served by each third-party server. In this way, server 10 may perform monitoring services for any number of different companies and any number of different locations in accordance with the techniques described herein.

Rather than forcing individual entities to create, maintain, and process commands for monitoring services, server 10 can provide a centralized service to provide the life-saving services for the third-party entities that focus on providing sensor devices and data regulation services to the user. Given the establishment of the monitoring service at server 10, additional third-party entities may utilize the already established monitoring capabilities for minimal costs to the entity that owns the server, and for reduced costs for the third-party entity due to the lack of need to generate their own monitoring. By having access to each entity's particular encoding and decoding system, conditions and signals can be transmitted between server 10 and the remote third-party server in a secure manner while still providing server 10 with the capability to provide the life-saving monitoring services to the end user. Further, by providing only the monitoring and alarm generating functions, the entity that operates server 10 may optimize those particular processes, thereby improving the overall computing environment in which this monitoring occurs. This also enables server 10 to extend its services to any off-the-shelf sensor device component.

Figure 2A:
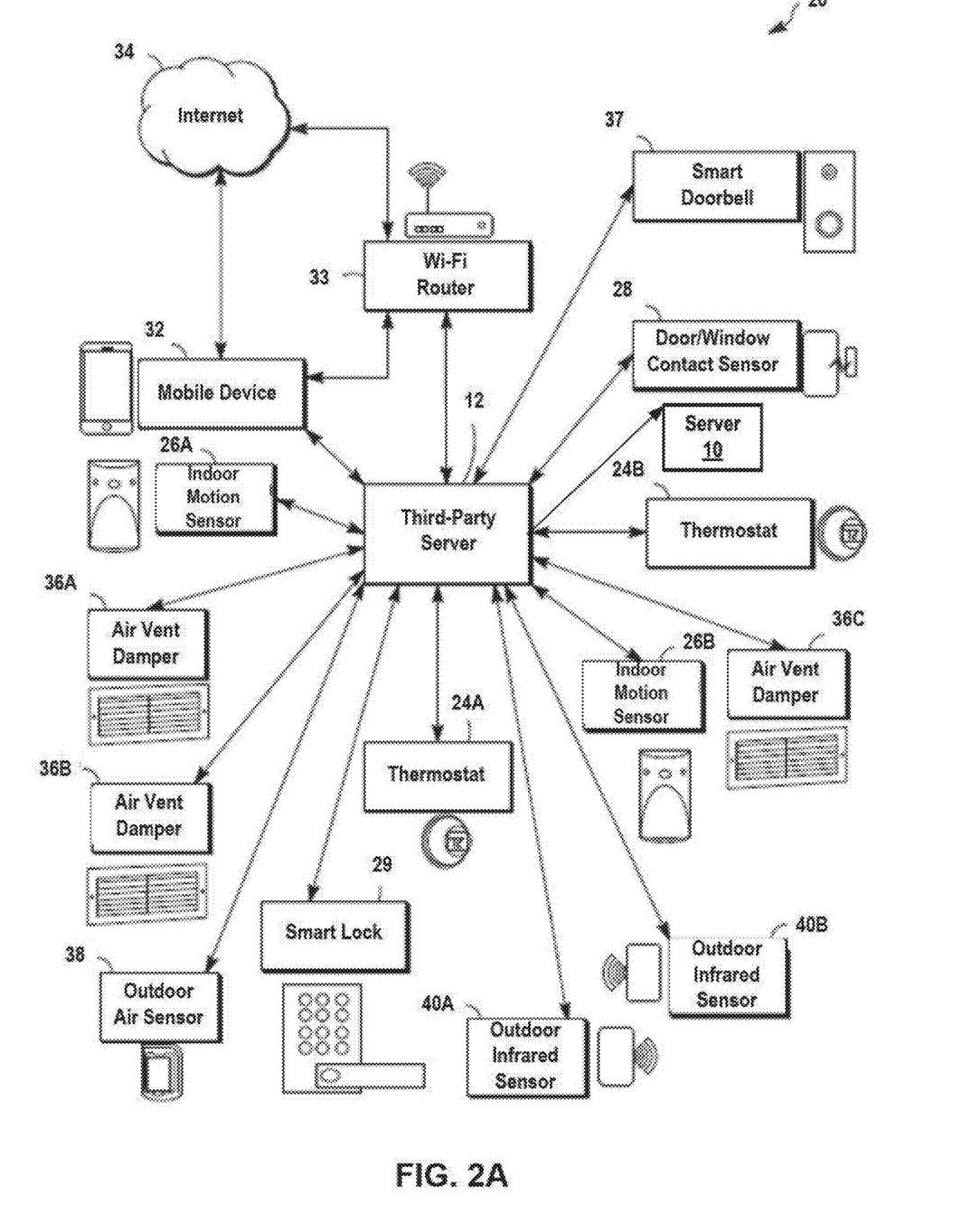
FIG. 2A is a conceptual block diagram illustrating an example of a home network, in accordance with some examples of this disclosure.

FIG. 2A is a conceptual block diagram illustrating a networked system 20, which may be one example of the networked system 10 of FIG. 1, in accordance with some examples of this disclosure. System 20 includes third-party server 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. The various devices of system 20 are for example purposes only. For example, additional devices may be added to system 20 and/or one or more devices of system 20 may be omitted.

The system 20 is a non-limiting example of the techniques of this disclosure. Other example systems may include more, fewer, or different components and/or devices. While FIG. 2A illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1×, 2G, 3G™, 4G™, 5G™, etc.), or another wireless broadband access.

Third-party server 12 may be in wireless data communication with thermostats 24, motion sensors 26, door/window contact sensor 28, air vent dampers 36, smart doorbell 37, outdoor air sensor 38, and infrared sensors 40, either directly (as shown in FIG. 2) or via internet 34 or Wi-Fi router 33. However, third-party server 12 may not ultimately evaluate the data received by any of the above sensors. Rather, third-party server 12 may forward the data to server 10, which evaluates the various conditions and performs actions based on those conditions.

Each of thermostats 24, motion sensors 26, door/window contact sensor 28, air vent dampers 36, smart doorbell 37, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from server 10.

Thermostats 24 may be configured to wirelessly transmit the temperature (e.g., sensor data) to server 10 via third-party server 12. Additionally, thermostats 24 may include controllable devices, in that they may activate or deactivate a heating, cooling, or ventilation system in response to receiving instructions from server 10. For example, thermostat 24A may collect temperature data and transmit the data to server 10 via third-party server 12. Server 10, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to server 10 via third-party server 12. Server 10 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to server 10 via third-party server 12. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to server 10 via third-party server 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to server 10, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to server 10 via third-party server 12. For instance, outdoor air sensor 38 may periodically output a current or average temperature to thermostats 24 via server 10 or third-party server 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to server 10 via third-party server 12. Server 10 may be configured to perform an action in response to receiving the sensor data, such as outputting an alert, such as a notification to mobile device 32, or by outputting a command for the respective passive infrared sensor 40 to output an audible or visual alert.

System 20 may include various devices, including, for example, a security device, a water heater, a water flow controller, a garage door controller, or other devices. For example, system 20 may include one or more of: a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices.

In accordance with the techniques of the disclosure, server 10 may receive, via third-party server 12, data indicative of a condition from any of thermostats 24, motion sensors 26, door/window contact sensor 28, air vent dampers 36, smart doorbell 37, outdoor air sensor 38, and infrared sensors 40. Upon confirming registration for the device and third-party server 12, server 10 may evaluate the data and the condition and perform any number of actions, including transmitting an alarm signal to a central monitoring station (e.g., a police station, a fire department, or an emergency medical service), transmit a notification to mobile device 32, or send instructions to the respective device to change a setting of the respective device.

Figure 2B:
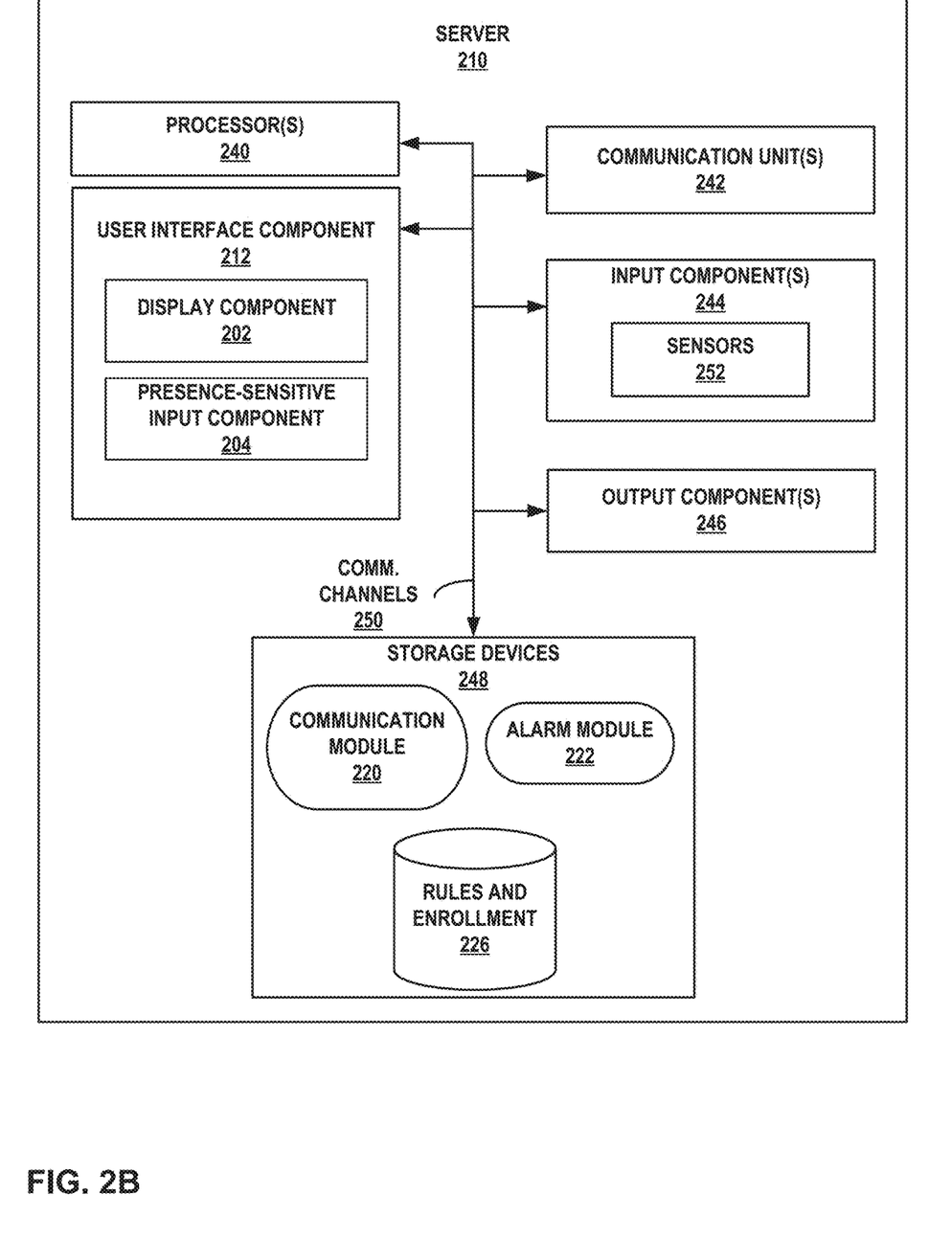
FIG. 2B is a conceptual block diagram illustrating a server in greater detail, in accordance with some examples of this disclosure.

FIG. 2B is a block diagram illustrating an example server device configured to provide monitoring services to remote third-party servers, in accordance with one or more aspects of the techniques described in this disclosure. Server 210 of FIG. 2B is described below as an example of computing device 110 of FIG. 1. FIG. 2 illustrates only one particular example of server 210, and many other examples of server 210 may be used in other instances and may include a subset of the components included in example server 210 or may include additional components not shown in FIG. 2B.

Server 210 may be any computer with the processing power required to adequately execute the techniques described herein. For instance, server 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2B, server 210 includes user interface component (UIC) 210, one or more processors 240, one or more communication units 242, one or more input components 244, one or more output components 246, and one or more storage components 248. UIC 212 includes display component 202 and presence-sensitive input component 204. Storage components 248 of server 210 include communication module 220, timing module 222, and rules data store 226.

One or more processors 240 may implement functionality and/or execute instructions associated with server 210 to receive signals that include data indicative of conditions at premises. That is, processors 240 may implement functionality and/or execute instructions associated with server 210 to evaluate signals to validate that the senders are registered and that the conditions are ones that warrant triggering an alarm condition.

Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of server 210. For example, processors 240 of server 210 may retrieve and execute instructions stored by storage components 248 that cause processors 240 to perform the operations described with respect to modules 220 and 222. The instructions, when executed by processors 240, may cause server 210 to evaluate signals to validate that the senders are registered and that the conditions are ones that warrant triggering an alarm condition.

Communication module 220 may execute locally (e.g., at processors 240) to provide functions associated with communicating, using communication units 242, with various sensor devices, third-party servers, and user devices. In some examples, communication module 220 may act as an interface to a remote service accessible to server 210. For example, communication module 220 may be an interface or application programming interface (API) to a remote server that facilitates communication with the various sensor devices, third-party servers, and user devices.

In some examples, alarm module 222 may execute locally (e.g., at processors 240) to provide functions associated with evaluating the received signals to validate the identity of the sender, the identity of the originating device, and the details surrounding the condition indicated in the signal. In some examples, alarm module 222 may act as an interface to a remote service accessible to server 210. For example, alarm module 222 may be an interface or application programming interface (API) to a remote server that evaluates the received signals to validate the identity of the sender, the identity of the originating device, and the details surrounding the condition indicated in the signal.

One or more storage components 248 within server 210 may store information for processing during operation of server 210 (e.g., server 210 may store data accessed by modules 220 and 222 and rules and enrollment data store 226 during execution at server 210). In some examples, storage component 248 is a temporary memory, meaning that a primary purpose of storage component 248 may not be long-term storage. Storage components 248 on server 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and rules and enrollment data store 226. Storage components 248 may include a memory configured to store data or other information associated with modules 220 and 222 and rules and enrollment data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of server 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of server 210 may receive input. Examples of input are tactile, audio, and video input. Input components 244 of server 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252), including both internal sensors and connections to external sensors. Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, motion sensor, passive infrared (PIR) sensor, air temperature and/or humidity sensor, air quality (e.g., carbon monoxide or particulate matter) sensor, a door or window contact sensor, or a step counter sensor.

One or more output components 246 of server 210 may generate output in a selected modality. Examples of modalities may include a tactile notification, audible notification, visual notification, machine generated voice notification, or other modalities. Output components 246 of server 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

User interface component (UIC) 212 of server 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of server 210, UIC 212 may also represent an external component that shares a data path with server 210 for transmitting and/or receiving input and output. For instance, in one example, UIC 212 represents a built-in component of server 210 located within and physically connected to the external packaging of server 210 (e.g., a screen on a mobile phone). In another example, UIC 212 represents an external component of server 210 located outside and physically separated from the packaging or housing of server 210 (e.g., a monitor, a projector, etc. that shares a wired and/or wireless data path with server 210).

UIC 212 of server 210 may detect two-dimensional and/or three-dimensional gestures as input from a user of server 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with one or more techniques of this disclosure, communication module 220 receives a signal from a remote third-party server. The signal may include data relating to a condition detected by a device at a premises, such as a type of the device, an event detected by the device, a status of a system located at the premises, other settings of the system located at the premises, an identifier of the device, an identifier of the remote third-party server, or any other information that may contribute to the evaluation of the condition by alarm module 222. The server may be at a first location different from the premises, and the remote third-party server may be at a second location different from each of the first location and the premises. In this way, the server, the remote third-party server, and the device may all be located in different placed, highlighting the distinct separation of each of these entities. Since the locations may be different, communication module 220 may provide an application programming interface (API) to the remote third-party server for transmission of the signal.

In some instances, the device at the premises may transmit the signal to third-party server without transmitting the signal to a control panel at the premises. In that sense, server 210 may be responsible for evaluating the aspects of the condition rather than passing the signal through a control panel associated with the third party.

Alarm module 222 determines whether the remote third-party server corresponds to a preexisting third-party server registration in rules and enrollment data store 226. Alarm module 222 also determines whether the device corresponds to a preexisting device registration in rules and enrollment data store 226.

Communication module 220 and alarm module 222 may populate rules and enrollment data store 226 with various third-party server and device information such that alarm module 222 can confirm these identities. For instance, communication module 220 may receive server enrollment information from the remote third-party server. The server enrollment information may include any one or more of a plurality of device types served by the remote third-party server, encoding keys, decoding keys, an identifier for the remote third-party server, and operational information for each of the plurality of device types. Alarm module 222 may store the server enrollment information as the preexisting third-party server registration in rules and enrollment data store 226.

Communication module 220 may also receive, from one or more of the remote third-party server or a remote user device, device enrollment information for the device at the premises. The device enrollment information may include any one or more of a device type from the plurality of device types, a contact identification, an indication of the remote third-party server, an identifier for the device, and operational information of the device at the premises. Alarm module 222 may store the device enrollment information as the preexisting device registration in rules and enrollment data store 226.

As such, in instances where the signal includes data indicative of a device identifier (e.g., a serial number, a media access control (MAC) address, an internet protocol (IP) address, etc.) and rules and enrollment data store 226 includes the device identifiers, when determining whether the device corresponds to the preexisting device registrations, alarm module 222 may compare the device identifier from the signal to the preexisting device registration in rules and enrollment data store 226. Should the device identifier match at least the portion of the preexisting device registration that includes the stored device identifier, alarm module 222 may determine that the device corresponds to the preexisting device registration.

When alarm module 222 determines that the remote third-party server corresponds to the preexisting third-party server registration and the device corresponds to the preexisting device registration, alarm module 222 may determine whether the condition detected by the device at the premises is an alarm condition. When alarm module 222 determines that the condition detected by the device at the premises is the alarm condition, communication module 220 transmits an alarm signal to a central monitoring station. The alarm signal may include an indication of an address of the premises and an indication of the condition to assist the central monitoring station. In some instances, to notify the user of the condition, when alarm module 222 determines that the condition detected by the device at the premises is the alarm condition, communication module 220 may transmit a notification signal to a remote user device.

In some examples of evaluating the alarm condition, communication module 220 may transmit an alarm query to a remote user device, wherein the alarm query comprises a description of the condition detected by the device at the premises and a confirm/deny request. Communication module 220 may then detect an alarm verification, which can be either a timeout condition detected by communication module 220 (e.g., detecting that a certain amount of time has passed without receiving a response from the remote user device) or an indication of a user selection of a confirm reply in response to the confirm/deny request received by communication module 220 from the remote user device. In response to communication module 220 receiving the alarm verification, alarm module 222 may determine that the condition detected by the device at the premises is the alarm condition. Conversely, if communication module 220 receives a false alarm verification (e.g., an indication of a user selection of a deny reply in response to the confirm/deny request received by communication module 220 from the remote user device), alarm module 222 may determine that the condition detected by the device at the premises is not the alarm condition. In this instance, communication module 220 may refrain from transmitting an alarm signal to the central monitoring station.

In other examples of evaluating the alarm condition, alarm module 222 may determine one or more characteristics of the condition based on the data in the signal. Using those characteristics, alarm module 222 may travers a logic structure (e.g., a logic tree) stored in rules and enrollment data store 226 until the server reaches a leaf node of the logic structure. In response to reaching the leaf node, alarm module 222 may determine whether an action indicated by the leaf node comprises providing the central monitoring station with a notification. The leaf node may either indicate an action in and of itself, or the leaf node may indicate a status that, using rules and enrollment data store 226, corresponds to a certain action. The action may be any one or more of providing the central monitoring station with the notification, conditionally providing the central monitoring station with the notification based on one or more settings of the device at the premises, conditionally providing the central monitoring station with the notification based on one or more settings of a network of devices at the premises, outputting a notification to a remote user device, and sending a confirm/deny request to the remote user device. When the action indicated by the leaf node comprises providing the central monitoring station with the notification, alarm module 222 may determine that the condition detected by the device at the premises is the alarm condition.

In one example, communication module 220 may receive a signal from a remote third-party server with data indicating a condition detected by an indoor camera at the premises. Alarm module 222, after verifying that the third-party server and the indoor camera are registered with rules and enrollment data store 226, may determine that motion was detected by the indoor camera. Following the logic structure, alarm module 222 may then determine whether the system at the premises is armed or disarmed. If alarm module 222 determines that the system is armed, alarm module 222 may reach a leaf node indicating that the alarm condition is met and the central monitoring station should be notified. Conversely, if alarm module 222 determines that the system is disarmed, alarm module 222 may first check privacy and/or system settings for the system at the premises to determine whether the settings indicate that the alarm condition is met. If the alarm condition is not met, communication module 220 may simply output a notification on a remote user device.

In another example, communication module 220 may receive a signal from a remote third-party server with data indicating a condition detected by a water leak detector at the premises. Alarm module 222, after verifying that the third-party server and the water leak detector are registered with rules and enrollment data store 226, may determine that a leak was detected by the water leak detector. Following the logic structure, alarm module 222 may then determine whether the system at the premises is armed or disarmed. If alarm module 222 determines that the system is armed, alarm module 222 may reach a leaf node indicating that the alarm condition is met and the central monitoring station should be notified. Conversely, if alarm module 222 determines that the system is disarmed, communication module 220 may output a notification on a remote user device with a request to confirm or deny that the water leak is accurate. If communication module 220 receives a confirmation of the water leak or does not receive a response within a certain time limit, communication module 220 may contact the central monitoring station. If communication module 220 instead receives a denial that the water leak is accurate, communication module 220 and alarm module 222 may disregard the initially received signal and condition.

In another example, communication module 220 may receive a signal from a remote third-party server with data indicating a condition detected by a smoke detector at the premises. Alarm module 222, after verifying that the third-party server and the smoke detector are registered with rules and enrollment data store 226, may determine that smoke was detected by the smoke detector. Following the logic structure, alarm module 222 may then determine whether the system at the premises is armed or disarmed. If alarm module 222 determines that the system is armed, alarm module 222 may reach a leaf node indicating that the alarm condition is met and the central monitoring station should be notified. Conversely, if alarm module 222 determines that the system is disarmed, communication module 220 may output a notification on a remote user device with a request to confirm or deny that the smoke is indicative of a fire at the premises. If communication module 220 receives a confirmation of the fire or does not receive a response within a certain time limit, communication module 220 may contact the central monitoring station. If communication module 220 instead receives a denial, indicating that the smoke may be due to bad cooking, communication module 220 and alarm module 222 may disregard the initially received signal and condition.

While these examples are described, other examples with different sensors are also possible using the techniques described herein. The listed examples are not exhaustive, and alarm module 222 and communication module 220 may follow similar logical analyses for different sensors and different conditions, such as conditions detected by a security device, a water heater, a water flow controller, a garage door controller, a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices that may perform the monitoring or automation functions described herein.

Figure 3:
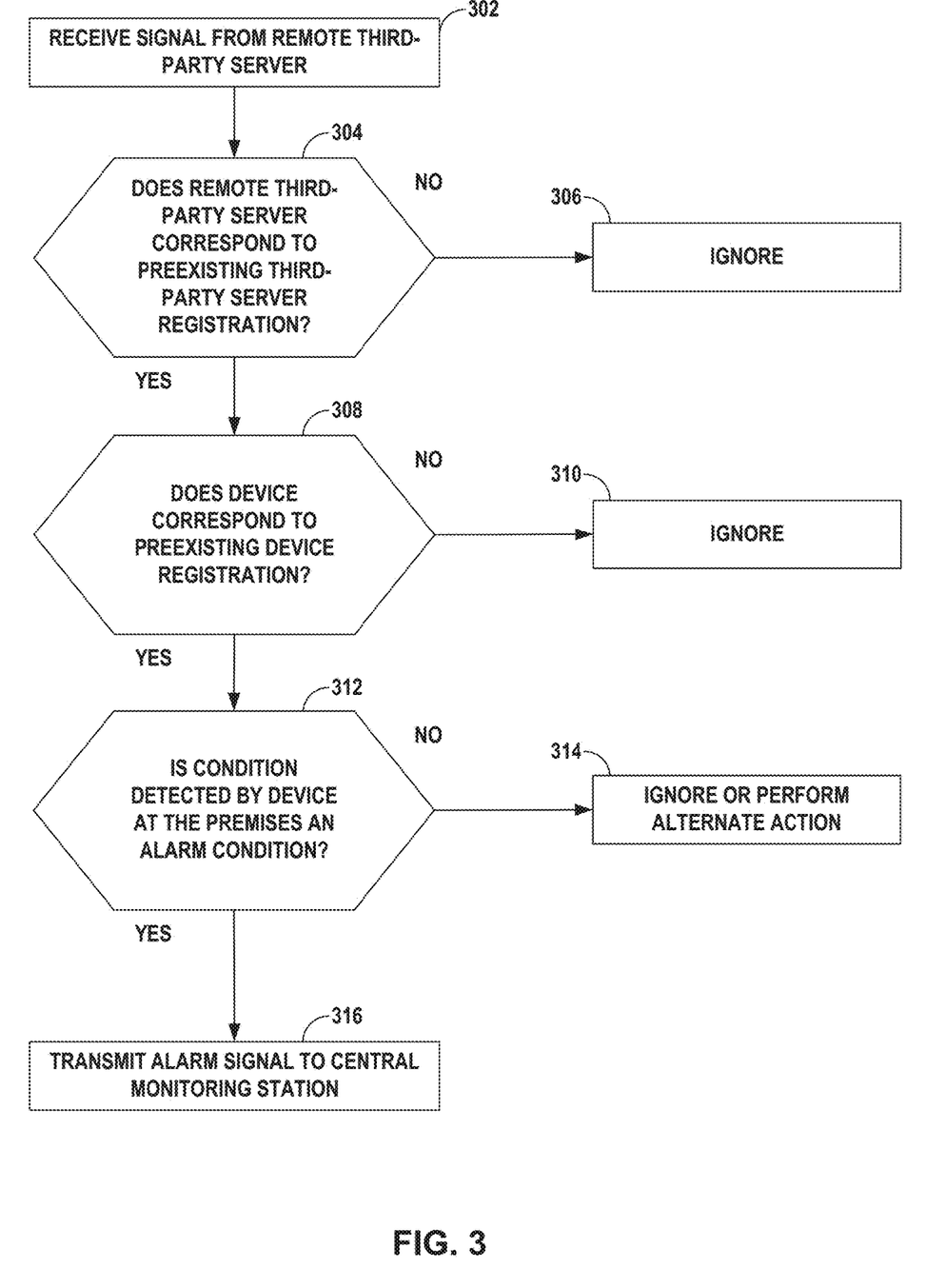
FIG. 3 is a flow diagram illustrating a method, in accordance with some examples of this disclosure.

FIG. 3 is a flow chart illustrating an example mode of operation for providing monitoring services to a third-party sensor setup. The techniques of FIG. 3 may be performed by one or more processors of a computing device, such as server 10 of FIG. 1 and/or server 210 illustrated in FIG. 2B. For purposes of illustration only, the techniques of FIG. 3 are described within the context of server 210 of FIG. 2, although computing devices having configurations different than that of computing device 210 may perform the techniques of FIG. 3.

In accordance with one or more techniques of this disclosure, communication module 220 receives a signal from a remote third-party server (302). The signal may include data relating to a condition detected by a device at a premises. Alarm module 222 determines whether the remote third-party server corresponds to a preexisting third-party server registration in rules and enrollment data store 226 (304).

If the alarm module 222 determines that the remote third-party server does not correspond to a preexisting third-party server registration in rules and enrollment data store 226 ("NO" branch of 304), alarm module 222 may ignore the received signal. Conversely, if alarm module 222 determines that the remote third-party server does correspond to a preexisting third-party server registration in rules and enrollment data store 226 ("YES" branch of 304), alarm module 222 determines whether the device corresponds to a preexisting device registration in rules and enrollment data store 226 (308).

If alarm module 222 determines that the device does not correspond to a preexisting device registration in rules and enrollment data store 226 ("NO" branch of 308), alarm module 222 may again ignore the signal (310). When the device is determined to correspond to the preexisting device registration ("YES" branch of 308), alarm module 222 determines whether the condition detected by the device at the premises is an alarm condition (312).

If alarm module determines that the condition detected by the device at the premises is not an alarm condition ("NO" branch of 312), alarm module 222 may either ignore the signal or may perform an alternate action (314), such as sending a notification to a remote user device or checking other settings. When the condition detected by the device at the premises is determined to be the alarm condition ("YES" branch of 312), communication module 220 transmits an alarm signal to a central monitoring station (316), such as a police station, a fire department, or an emergency medical service.

Figure 4:
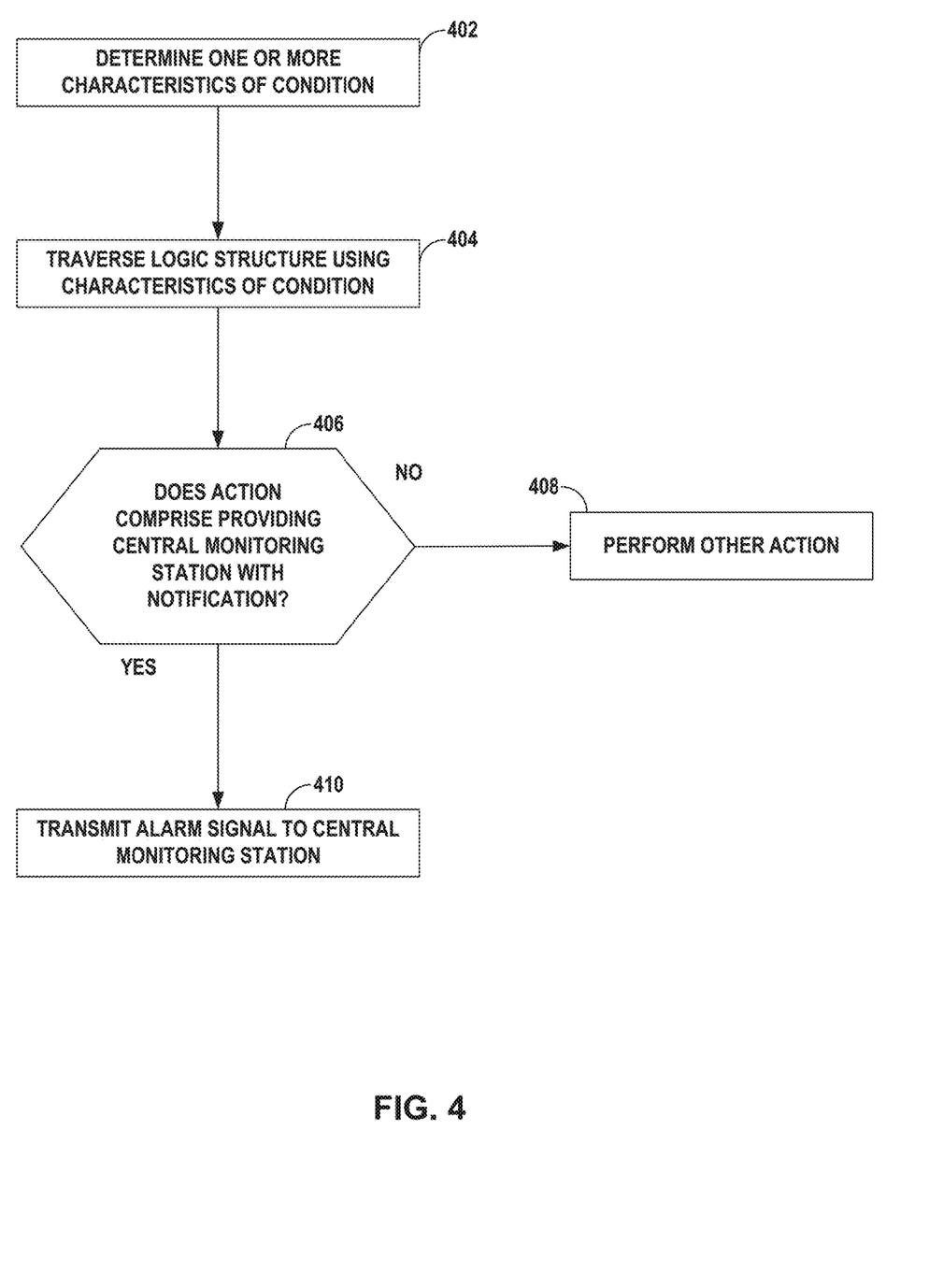
FIG. 4 is a flow diagram illustrating a method, in accordance with some examples of this disclosure.

FIG. 4 is a flow chart illustrating an example mode of operation for determining whether a condition detected by a device on a premises is an alarm condition. The techniques of FIG. 4 may be performed by one or more processors of a computing device, such as server 10 of FIG. 1 and/or server 210 illustrated in FIG. 2B. For purposes of illustration only, the techniques of FIG. 4 are described within the context of server 210 of FIG. 2, although computing devices having configurations different than that of computing device 210 may perform the techniques of FIG. 4.

In accordance with one or more techniques of this disclosure, alarm module 222 determines one or more characteristics of the condition (402). These conditions may include a type of device that detected the condition (e.g., a glass break sensor, an entry sensor, a flood sensor, a motion sensor, etc.), the event detected by the device (e.g., glass broken, entryway opened, water detected, motion detected, etc.), or an armed status (e.g., home armed, home disarmed, etc.), among other things. Alarm module 222 may traverse a logic structure, such as a logic tree, using the one or more characteristics of the condition until the server reaches a leaf node of the logic structure (404). For instance, a first layer of the logic structure may branch based on the device that originated the condition, a second layer of the logic structure may branch based on the event detected by the device, and a third layer of the logic structure may branch based on the armed status of the premises, although one or more of these layers may be different or removed from other examples, or additional layers may exist (e.g., checking a defined setting of the particular premises). The leaf node may be an endpoint of the logic structure, where contents of the node include an indication of some sort of action to be taken by alarm module 222 and communication module 220 based on the logic structure traversal.

In response to reaching the leaf node, alarm module 222 determines whether an action indicated by the leaf node comprises providing the central monitoring station with a notification (406). If alarm module 222 determines that at least the first course of action is not to provide the central monitoring station with the notification ("NO" branch of 406), communication module 220 and/or alarm module 220 may perform some other action (408), such as sending a notification to a remote user device. Conversely, when the action indicated by the leaf node comprises providing the central monitoring station with the notification ("YES" branch of 406), communication module 220 may transmit an alarm signal to the central monitoring station (e.g., a police station or a fire department).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
    receiving, by a server, a signal from a remote third-party server, the signal including data relating to a condition detected by a device at a premises, wherein the server is at a first location different from the premises, and wherein the remote third-party server is at a second location different from each of the first location and the premises;
    determining, by the server, whether the remote third-party server corresponds to a preexisting third-party server registration;
    determining, by the server, whether the device corresponds to a preexisting device registration;
    when the remote third-party server is determined to correspond to the preexisting third-party server registration and the device is determined to correspond to the preexisting device registration, determining, by the server, whether the condition detected by the device at the premises is an alarm condition; and
    when the condition detected by the device at the premises is determined to be the alarm condition, transmitting, by the server, an alarm signal to a central monitoring station.

2. The method of claim 1, wherein the signal further includes data indicative of a device identifier, and wherein determining whether the device corresponds to the preexisting device registration comprises:
    comparing, by the server, the device identifier to the preexisting device registration; and
    determining, by the server, that the device corresponds to the preexisting device registration when the device identifier matches at least a portion of the preexisting device registration.

3. The method of claim 2, wherein the device identifier comprises one or more of a serial number, a media access control (MAC) address, and an internet protocol (IP) address.

4. The method of claim 1, wherein the device at the premises transmits the signal to the remote third-party server without transmitting the signal to a control panel at the premises.

5. The method of claim 1, wherein determining that the condition detected by the device at the premises is the alarm condition comprises:
    transmitting, by the server, an alarm query to a remote user device, wherein the alarm query comprises a description of the condition detected by the device at the premises and a confirm/deny request;
    detecting, by the server, an alarm verification; and
    in response to receiving the alarm verification, determining, by the server, that the condition detected by the device at the premises is the alarm condition.

6. The method of claim 5, wherein the alarm verification comprises one of a timeout condition detected by the server or an indication of a user selection of a confirm reply in response to the confirm/deny request received by the server from the remote user device.

7. The method of claim 5, further comprising:
    receiving, by the server, a second signal from the remote third-party server, the second signal including data relating to a second condition detected by the device at the premises;
    determining, by the server, whether the remote third-party server corresponds to the preexisting third-party server registration;
    determining, by the server, whether the device corresponds to the preexisting device registration;
    when the remote third-party server is determined to correspond to the preexisting third-party server registration and the device is determined to correspond to the preexisting device registration, transmitting, by the server, a second alarm query to the remote user device, wherein the second alarm query comprises a description of the second condition detected by the device at the premises and a second confirm/deny request;
    receiving, by the server, a false alarm verification;
    in response to receiving the false alarm verification, determining, by the server, that the second condition detected by the device at the premises is not the alarm condition; and
    when the second condition detected by the device at the premises is determined not to be the alarm condition, refraining, by the server, from transmitting a second alarm signal to the central monitoring station.

8. The method of claim 7, wherein the false alarm verification comprises an indication of a user selection of a deny reply in response to the second confirm/deny request received by the server from the remote user device.

9. The method of claim 1, further comprising:
when the condition detected by the device at the premises is determined to be the alarm condition, transmitting, by the server, a notification signal to a remote user device.

10. The method of claim 1, further comprising:
providing, by the server, an application programming interface (API) to the remote third-party server for transmission of the signal.

11. The method of claim 1, wherein the alarm signal includes an indication of an address of the premises.

12. The method of claim 1, wherein determining whether the condition detected by the device at the premises is the alarm condition comprises:
determining, by the server, one or more characteristics of the condition;
traversing, by the server, a logic structure using the one or more characteristics of the condition until the server reaches a leaf node of the logic structure; and
in response to reaching the leaf node, determining, by the server, whether an action indicated by the leaf node comprises providing the central monitoring station with a notification; and
when the action indicated by the leaf node comprises providing the central monitoring station with the notification, determining, by the server, that the condition detected by the device at the premises is the alarm condition.

13. The method of claim 12, wherein the action indicated by the leaf node comprises one or more of:
providing the central monitoring station with the notification,
conditionally providing the central monitoring station with the notification based on one or more settings of the device at the premises,
conditionally providing the central monitoring station with the notification based on one or more settings of a network of devices at the premises,
sending a notification to a remote user device, and
sending a confirm/deny request to the remote user device.

14. The method of claim 1, further comprising:
receiving, by the server, server enrollment information from the remote third-party server, the server enrollment information including one or more of a plurality of device types served by the remote third-party server, encoding keys, decoding keys, an identifier for the remote-third-party server, and operational information for each of the plurality of device types;
storing, by the server, the server enrollment information as the preexisting third-party server registration;
receiving, by the server and from one or more of the remote third-party server or a remote user device, device enrollment information for the device at the premises, the device enrollment information including one or more of a device type from the plurality of device types, an indication of the remote third-party server, an identifier for the device, a contact identification, and operational information of the device at the premises; and
storing, by the server, the device enrollment information as the preexisting device registration.

15. A server comprising:
one or more communication units; and
one or more processors configured to:
receive, via the one or more communication units, a signal from a remote third-party server, the signal including data relating to a condition detected by a device at a premises;
determine whether the remote third-party server corresponds to a preexisting third-party server registration;
determine whether the device corresponds to a preexisting device registration;
when the remote third-party server is determined to correspond to the preexisting third-party server registration and the device is determined to correspond to the preexisting device registration, determine whether the condition detected by the device at the premises is an alarm condition; and
when the condition detected by the device at the premises is determined to be the alarm condition, transmit, via the one or more communication units, an alarm signal to a central monitoring station,
wherein the server is at a location different from the premises and different from the remote third-party server, and wherein the server is configured to receive the data relating to the condition detected by the device at the premises from the remote third-party server such that the server is not in direct communication with the device at the premises.

16. The server of claim 15, wherein the signal further includes data indicative of a device identifier, and wherein determining whether the device corresponds to the preexisting device registrations comprises:
comparing, by the server, the device identifier to the preexisting device registration; and
determining, by the server, that the device corresponds to the preexisting device registration when the device identifier matches at least a portion of the preexisting device registration.

17. The server of claim 15, wherein the one or more processors being configured to determine that the condition detected by the device at the premises is the alarm condition comprises the one or more processors being configured to:
transmit an alarm query to a remote user device, wherein the alarm query comprises a description of the condition detected by the device at the premises and a confirm/deny request;
detect an alarm verification; and
in response to receiving the alarm verification, determine that the condition detected by the device at the premises is the alarm condition.

18. The server of claim 15, wherein the one or more processors being configured to determine that the condition detected by the device at the premises is the alarm condition comprises the one or more processors being configured to:
determine one or more characteristics of the condition;
traverse a logic structure using the one or more characteristics of the condition until the server reaches a leaf node of the logic structure; and
in response to reaching the leaf node, determine whether an action indicated by the leaf node comprises providing the central monitoring station with a notification; and
when the action indicated by the leaf node comprises providing the central monitoring station with the notification, determine that the condition detected by the device at the premises is the alarm condition.

19. A non-transitory computer-readable storage medium having stored thereon instructions that, when executed, cause one or more processors of a server to:

receive a signal from a remote third-party server, the signal including data relating to a condition detected by a device at a premises, wherein the server is at a location different from the premises and different from the remote third-party server, and wherein the server is configured to receive the data relating to the condition detected by the device at the premises from the remote third-party server such that the server is not in direct communication with the device at the premises;

determine whether the remote third-party server corresponds to a preexisting third-party server registration;

determine whether the device corresponds to a preexisting device registration;

when the remote third-party server is determined to correspond to the preexisting third-party server registration and the device is determined to correspond to the preexisting device registration, determine whether the condition detected by the device at the premises is an alarm condition; and when the condition detected by the device at the premises is determined to be the alarm condition, transmit an alarm signal to a central monitoring station.

20. The method of claim 1, wherein the device at the premises sends the data to the remote third-party server and the remote third-party server sends the signal to the server such that the device at the premises is not in direct communication with the server.

* * * * *